UNITED STATES PATENT OFFICE.

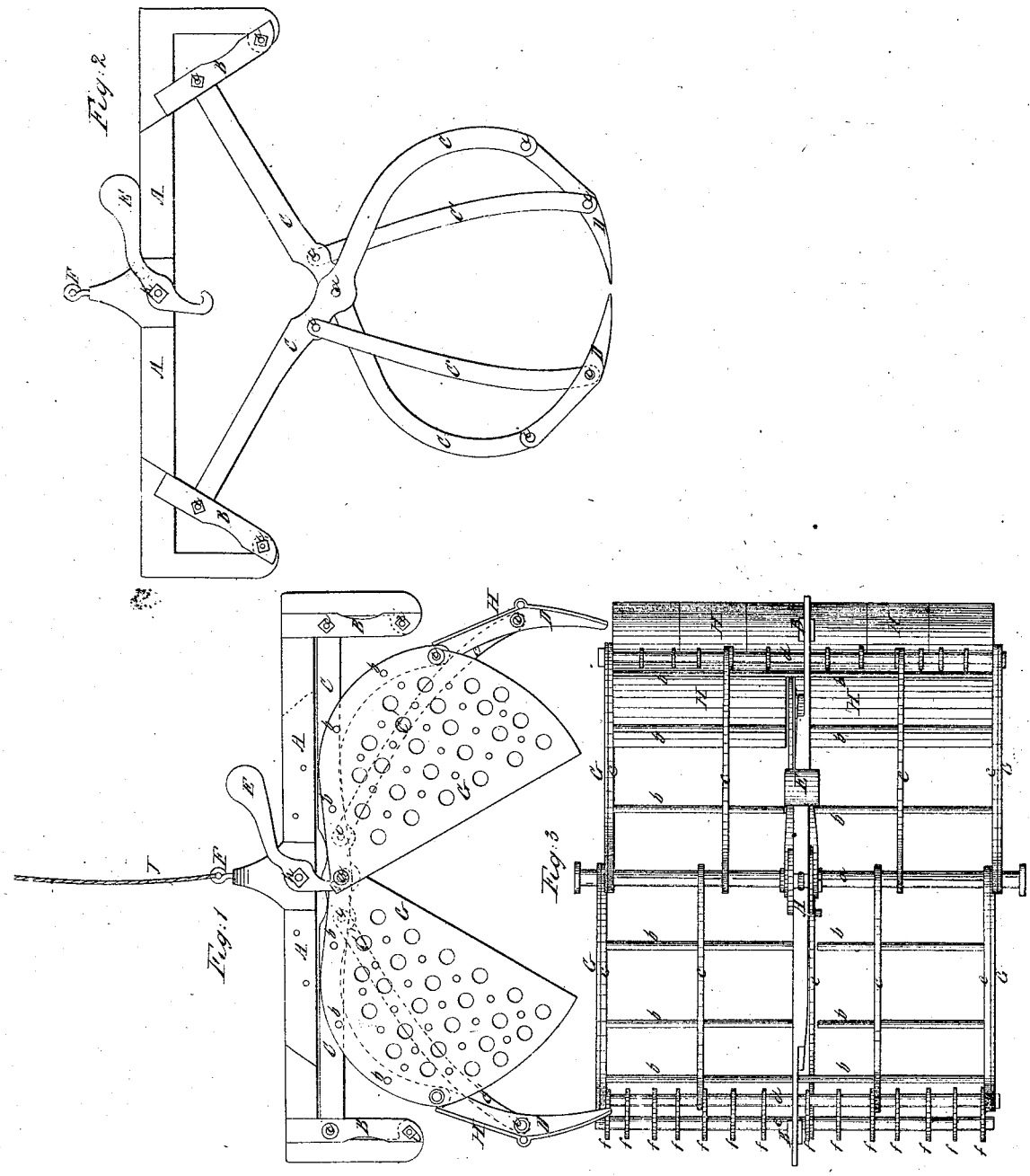

ASA BLOOD, SR., OF NORFOLK, VIRGINIA.

DREDGING-MACHINE.

Specification of Letters Patent No. 17,959, dated August 11, 1857.

*To all whom it may concern:*

Be it known that I, ASA BLOOD, Sr., of Norfolk city and county, in the State of Virginia, have invented a new and useful Grappling - Machine or Dredge for Catching Oysters, Recovering Sunken Articles, Dredging Harbors, and Similar Purposes; and I do hereby declare that the following is a full and exact description thereof, reference being had to the accompanying drawings and to the letters of reference marked thereon.

To enable others skilled in the art to make and use my invention I will proceed to describe its construction and operation.

Figure 1, is a side elevation, the machine being open and ready to be let down into the water. Fig. 2, is a side elevation of the levers for operating the machine, shown closed. Fig. 3, is a plan view, with the flap of one side removed.

In Fig. 1, A, the main beam or crossbar with descending arms to which the levers are attached; B, the sliding levers; C, the main levers for operating the dredge; C′, the compound levers; D, the teeth; E, the dog for holding the dredge open while descending; F, the hook to which the rope or chain for lowering or raising the dredge, is attached; h, the bolt fastening the dog to the main beam; i, joints connecting the various levers; G, end plates, beam or cross bar.

In Fig. 2, A, the main beam or cross bar; B, the adjustable lever attached to the descending arms of beam A; C, operating lever; C′, compound levers; E, the dog for holding open the dredge; F, the hook to which chain or rope is attached; J, the chain or rope; h the bolt or screw through dog E, and beam A.

In Fig. 3, A, the mainbeam or cross bar; B, the sliding or adjustable levers; E, the dog; a the center rod on which all of the levers work; b horizontal braces; c vertical braces; d, bars on which the teeth turn; e the bar to which the teeth are attached; f, the teeth; H, the sheathing to be attached, when it is desired to lift mud, and sand, and similar substances.

In the operation of my invention, the machine when used can be hung by the cord J to an arm which may be attached to a spar or mast in the center of the boat or vessel. The vessel may be rigged with one of these machines on each side. The machine is then opened, and the lower end of dog E, with hooks on it catches around main rod $a$, which thus serves to hold it open until it reaches the bottom. When the machine is thus set, the levers C are on a straight line with cross beam A, and levers B, are nearly in a vertical position, or nearly parallel to the descending arms of cross beam A. As soon as the dredge reaches the bottom, the weight being relieved from the chain or rope, the dog disengages its hold, the upper end being weightier than the lower causes it to fall down on the main arm, when the hooks are thus disengaged; the dredge is now on the bottom, open and ready for dredging.

If simply used for dredging oysters, the flaps as seen in Fig. 3 are not needed, as only the teeth will be wanted; but, if used for other purposes, then the flap can be used, and any substance as mud or sand can be excavated with it. The operator will now commence to draw at the rope, which will cause the beam A to rise, and as the fulcrum of levers C are on rod $a$, as beam A is raised the tendency is to cause the upper ends of levers B, to slide to the center of the machine thus elevating the upper end of the levers C′ causing it to rise with it, the lower ends of levers C′ being attached to rods $e$ causes the teeth to come together, and the weight of the machine will keep it into the ground so that, by the time the dredge is closed it will be filled with whatever it is intended to elevate, whether oysters, stones, mud, or sand, or any other articles wished to be raised. When thus filled it can be raised by block and tackle, or any best adapted means. When raised it can be swung over the boat, and lowered so as to let the ends of the main rod $a$ rest on bearings for the purpose, and then the weight of material in it will cause it to open.

It will be seen that by the combination of my levers B, C, and C′, I am enabled to apply any amount of power to the jaws of my dredge in bringing them together.

Having thus fully described the construction and operation of my invention, what I claim as new, and desire to secure by Letters Patent, is,

1. The dog E, in combination with the beam A, and rod *a* operating as described for the purpose of holding the dredge open in descending, and for relieving its hold by its own weight as soon as the weight is taken off of the chain or rope.

2. The combination of the levers B, C, and C′, with beam A, and rod *e* operating as described, for the purpose of opening and closing the dredge as described.

ASA BLOOD, Sr.

Witnesses:
 EDW. F. BROWN,
 JOS. C. CLAYTON.